Figure 1:
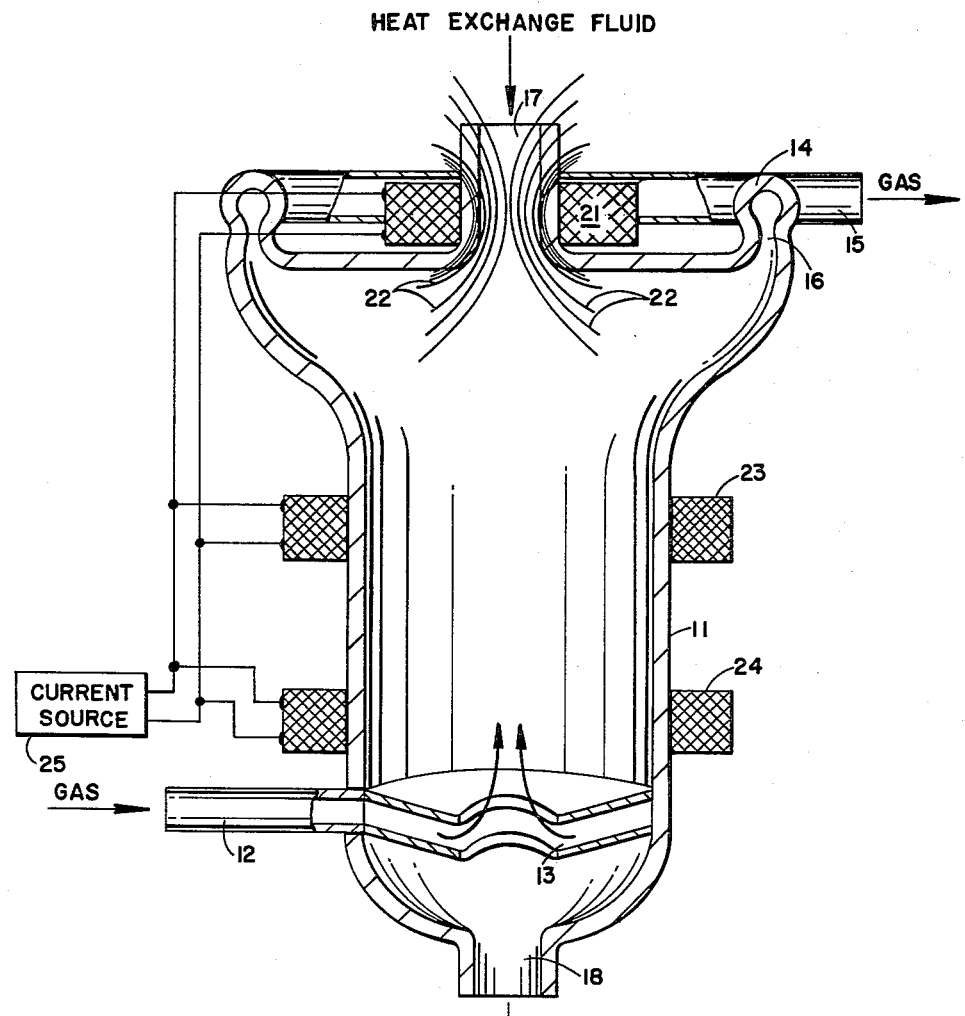

Jan. 14, 1964 R. J. ROSA 3,118,008
GAS AND LIQUID CONTACT HEAT EXCHANGER
Filed Sept. 1, 1961

RICHARD J. ROSA
*INVENTOR.*

BY Alden D. Redfield
Melvin E. Frederick
ATTORNEYS

United States Patent Office 3,118,008
Patented Jan. 14, 1964

3,118,008
GAS AND LIQUID CONTACT HEAT EXCHANGER
Richard J. Rosa, Reading, Mass., assignor to Avco Corporation, Cincinnati, Ohio, a corporation of Delaware
Filed Sept. 1, 1961, Ser. No. 135,499
2 Claims. (Cl. 261—1)

The present invention relates to a means for exchanging heat and, more particularly, to liquid-gas heat exchangers or regenerators employing electrically conductive fluids in which maximum heat transfer is achieved by the application of a magnetic field to the electrically conductive fluid.

This invention is especially applicable to high temperature installations in which electrically conductive heat transfer fluids, such as slag or liquid metals, are available.

In a liquid-gas heat exchanger or regenerator the heat transfer fluid is generally introduced at the top of the heat exchanger and permitted to fall to the bottom thereof while a gas is introduced at the bottom and exhausted at the top of the heat exhanger. Thus, it is desirable to have means that functions to extend the length of time that the fluid is in the heat exchanger and disperse the fluid stream as it enters the heat exchanger and break it up into drops of a size that will lose or gain temperature nearly uniformly throughout and that will not just get heated and/or cooled on their surfaces.

If the fluid is slag or a liquid metal, for example, at elevated temperatures, means of a conventional nature or means that function, for example, in the same manner as a "shower head" that will provide good dispersion, long life, and require minimum maintenance is, to say the least, difficult to provide.

The present invention comprises a means for exchanging heat in which an electrically conductive heat exchange fluid is introduced and subjected to the action of a magnetic field to provide dispersion of the fluid within a heat exchanger.

It is, therefore, an object of the present invention to provide a means for exchanging heat between a fluid and a gas.

It is another object of the present invention to provide a liquid-gas heat exchanger that utilizes a heat exchange fluid that is electrically conductive.

Another object of the present invention is to provide a liquid-gas heat exchanger that utilizes an electrically conductive heat exchange fluid at elevated temperatures and which will provide good dispersion of the heat exchange fluid, long life, and that will require minimum maintenance.

A still further object of the present invention is the provision in a liquid-gas heat exchanger of means for dispersing an electrically conductive heat exchange fluid.

A still further object of the present invention is the provision of means for dispersing an electrically conductive fluid at elevated temperatures.

Figure 2:
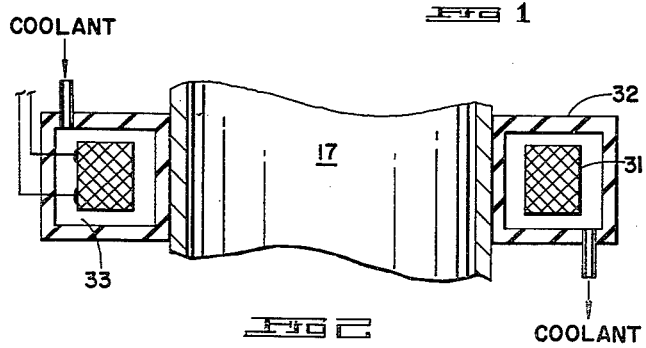

The novel features that are considered characteristic of the present invention are set forth in the appended claims; the invention itself, however, both as to its organization, together with the additional objects and advantages thereof, will best be understood from the following description of a specific embodiment when read in conjunction with the accompanying drawings, in which:

FIGURE 1 is a diagrammatic representation of apparatus incorporating the present invention; and FIGURE 2 is a fragmentary and diagrammatic representation of a superconducting coil in accordance with the present invention.

With reference now to FIGURE 1, there is diagrammatically illustrated a heat exchanger comprising a generally cylindrical heat exchange chamber 11 for receiving both a heat exchange fluid and a gas. In accordance with conventional practice, a gas from any suitable source is introduced into the heat exchange chamber 11 through a pipe 12 and an inlet header 13 near its lower end and exhausted from the upper end of the chamber through an outlet header 14 and pipe 15. As illustrated, the outer periphery of the upper end of the heat exchange chamber 11 is flared outwardly and upwardly to provide an annular space 16 that communicates with the gas outlet header 14. The particular means or direction of introducing and exhausting the gas is not essential to the present invention and, as is well known, may be satisfactorily accomplished in any one of a number of different ways well known to those skilled in the art. A fluid inlet passage 17 is provided in the upper portion of the heat exchange chamber 11 to permit a heat exchange fluid to be introduced into the heat exchange chamber. A fluid outlet passage 18 is provided at the bottom of the chamber. The fluid inlet and outlet passages 17 and 18 are illustrated as being located concentric with the longitudinal axis of the heat exchange chamber. If desired, longitudinally disposed insulating fins may be provided in the fluid inlet passage 17 upstream of coil 21 to reduce eddy currents in the fluid and thereby reduce drag on the fluid as it enters the magnetic field provided by coil 21.

Surrounding the fluid inlet passage adjacent its junction with the heat exchange chamber is a continuous electrical coil 21 which provides a magnetic field longitudinally in the inlet passage and extending into the heat exchange chamber, indicated generally by the lines of force 22. Coil 21 is connected to a current source 25 which is preferably D.C. While the direction of current flow in the coil is not material, it is important that the coil provide a magnetic field in the fluid inlet passage and a portion of the heat exchange chamber of such orientation and strength as to effectively influence the electrically conductive heat exchange fluid passing therethrough to cause it to be dispersed as it enters the heat exchange chamber and counteract the natural tendency of the fluid to fall in a solid stream, like water from a faucet. Thus, the magnetic field may have an orientation either transverse or longitudinal of the direction of flow of the fluid. The coil 21 may have either a large or a small length to diameter ratio, the large length to diameter ratio being preferable. In any event, the lower end of coil 21 must be sufficiently close to or abut the heat exchange chamber 11 so that in the case where the lines of force 22 provided by coil 21 in the fluid inlet passage 17 are essentially parallel to the direction of flow of fluid in passage 17 or contain a transverse component, the lines of force extend into the heat exchange chamber and diverge in this region. Stating it another way, a steep field gradient must be provided principally within the heat exchange chamber at the junction of the fluid inlet passage and the heat exchange chamber. Thus, for a magnetic field oriented longitudinally of the direction of flow in the inlet passage, the field gradient will be highest along the junction of the inlet passage and the heat exchange chamber.

Although only one fluid inlet passage and associated electromagnetic coil is illustrated, it is to be understood that a plurality of such passages and coils may be provided in the upper portion or wall of the chamber 11 and supplied, for example, from a fluid inlet header or the like. Such an arrangement has the advantage of reducing the volume of fluid subjected to the influence of a particular magnetic field and thereby increasing the efficiency of the magnetic field on the fluid without reducing the total volume of fluid introduced into the heat exchange chamber. Consequently, this arrangement facilitates the production of a steep field gradient essential for optimum operation. Such an arrangement does, however, require the provision of a plurality of magnetic fields.

Coils 23 and 24 carried by the heat exchange chamber intermediate the fluid inlet and outlet means 17 and 18 are connected to the current source 25, are essentially the same as coil 21, and provide a repeating magnetic field pattern. Thus, for a static magnetic field distribution, the electrically conductive heat exchange fluid moving through a field gradient provided by either coil 21, 23, and/or 24, will experience a force tending to retard or a force that is always at least partially opposed to the direction of movement of the fluid, i.e., a force that is never in the same direction as the motion of the fluid irrespective of the direction of the field gradient or the field itself.

The number of coils provided between the fluid inlet and outlet means will depend on the length of the heat exchange chamber. Such coils should preferably be spaced one from another a distance equal to about the diameter of the heat exchange chamber.

An A.C. magnetic field will also provide an upward force on the descending heat exchange fluid within the heat exchange chamber provided the A.C. magnetic field is characterized by an upwardly moving field pattern similar to that in linear induction machines. While such an arrangement will exert greater forces on the descending heat exchange fluid than will a static field, it will introduce design considerations that need not be considered in connection with a static field. Briefly, an upwardly moving field pattern may be provided by winding a tapped continuous coil along the length of the chamber 11 between the fluid inlet and outlet passges 17 and 18 and connecting it to a polyphase source of current.

In order to better appreciate the operation of the present invention a discussion of the influence of a magnetic field on an electrically conductive fluid is appropriate.

Consider a sphere of radius R, falling through a magnetic field gradient $$\frac{dB}{dx}$$

comprised of a material having an electrical conductivity $\sigma$, and a density $\rho$. Consider further that the sphere is falling at a velocity U through free space having a permeability $\mu_0$.

On the basis of the above assumptions, it can be shown that the sphere will have induced in it a magnetic moment $m$ approximately equal to $$m = \frac{2\pi}{15} \mu_0 \sigma U R^3 \frac{dB}{dx}$$

From the above, it can be shown that the sphere will experience a generally upward force F approximately equal to $$F = \frac{m}{\mu_0} \frac{dB}{dx} = \frac{2\pi}{15} \sigma U R^5 \left(\frac{dB}{dx}\right)^2$$

The mass M of the sphere is given by the equation $$M = \tfrac{4}{3} \pi R^3 \rho$$

and its acceleration will be approximately equal to $$\frac{F}{M} = \frac{1}{10} \frac{\sigma U R^2}{\rho} \left(\frac{dB}{dx}\right)^2$$

Equating the equation for acceleration to the acceleration of gravity (9.8 meters/sec.²) gives a constant or "equilibrium" falling velocity $U_e$ approximately equal to $$U_e = 98 \frac{\rho}{\sigma \left(\frac{dB}{dx}\right)^2 R^2}$$

Assuming a field gradient $$\frac{dB}{dx}$$

of approximately 10 webers per square meter per meter and a sphere having an electrical conductivity $\sigma$ of $10^6$ mhos per meter and a density of $\rho$ of $10^3$ kilograms per cubic meter, the equilibrium velocity $U_e$ of the sphere in the magnetic field is $$\frac{20}{R^2}$$

where R is the radius of the sphere in centimeters. Thus, a sphere having a radius of 0.1 centimeter will have an equilibrium velocity of about 200 meters per second; a sphere having a radius of 1 centimeter will have an equilibrium velocity of about 20 meters per second; and a sphere having a radius of 10 centimeters will have an equilibrium velocity of 0.2 meter per second.

From the above it will be seen that the field gradient acts to let small particles fall more rapidly than large ones. Such an effect is exactly what is desired for optimum heat transfer. Thus, as an electrically conductive fluid, such as, for example, high temperature slag, liquid metal, or the like, is introduced into the heat exchange chamber through the fluid inlet passage, and consequently through the magnetic field provided by coil 21, the magnetic field tends to throw the descending fluid radially outward and restrain the fluid until it breaks up into fragments or particles of a reasonable size.

In this manner, the magnetic field provided by coils 21, 23, and 24, and especially coil 21, tends to disperse an electrically conductive heat exchange fluid over the whole diameter of the chamber, thereby providing droplets that are small enough so that all the available heat can be transferred to or from them before they reach the bottom of the heat exchange chamber.

The repeating field pattern provided by coils 23 and 24 has a field gradient less steep than that of the magnetic field provided by coil 21 due to the increased diameter of the heat exchange chamber and, therefore, is somewhat less effective. However, the provision of a repeating field pattern intermediate the fluid inlet and outlet means 17 and 18 is advantageous in that large particles that escape or coalesce after leaving the magnetic field provided by coil 21 are subjected to the influence of the repeating field pattern wherein the above-described process is repeated.

The heat exchange fluid should have a conductivity that is high enough to render it a reasonably good conductor although not as good a conductor as copper. By way of example, the conductivity of the fluid may be within one or two orders of magnitude of that of copper. Various electrically conductive fluids may be used. In the case of high temperature liquid metals, it must have a vaporization and melting point greater than, respectively, the desired fluid inlet and outlet temperature. While liquid sodium may not generally be considered desirable because it tends to vaporize too easily, liquid lead, slag, aluminum, copper, silver and the like may be used. On the other hand, mercury and sodium-potassium alloys (commonly called "Nak") are liquid at room temperature and are electrically conductive.

As may now be evident, it is desirable to have as steep a field gradient (change of field strength) as practically possible. Thus, the present invention lends itself to the use of superconductive magnetic coils in the provision of a magnetic field or fields having large field gradients.

The theory and application of superconductivity is discussed in detail in the following books: D. Shoenberg, "Superconductivity," second edition. The Syndics of the Cambridge University Press, London, England (1952); and N. Von Laue, "Theory of Superconductivity," Academic Press, New York (1952).

Briefly stated, superconductivity may be defined as the characteristic of certain materials, when cooled below particular transition temperatures in the vicinity of absolute zero, to lose all resistance and become perfect conductors.

The provision of a superconductive coil is diagrammatically illustrated in FIGURE 2. As shown in this figure, a portion of the heat exchange chamber, such as, for example, the fluid inlet passage 17 of FIGURE 1, is surrounded by a coil 31 composed of a suitable superconductive material enclosed by and spaced from an insulating jacket 32 to permit a coolant, such as liquid helium, to be introduced into the region 33 defined by the insulating jacket 32 and the coil 31. The liquid helium surrounds and maintains the coil 31 below its critical temperature and thus, in a superconductive condition. The entire assembly is mounted on the heat exchange chamber at the desired location.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In a heat exchanger system the combination comprising: an upright and unobstructed heat exchange chamber for receiving a high temperature electrically conductive fluid and having fluid inlet means at its upper end, the minimum internal transverse dimension of said chamber being at least several times greater than the total internal transverse dimension of said inlet means; means for introducing said electrically conductive fluid into said chamber through said inlet means; means located at the junction of said inlet means and said chamber for providing in said inlet means a magnetic field having a steep field gradient, said field gradient being highest at the junction of said inlet means and said chamber, said magnetic field extending into said chamber and having a direction in said fluid inlet means substantially the same as the direction of flow in said inlet means and extending radially outwards in said chamber to cause said fluid to be substantially broken up into droplets and directed radially outwardly as it enters said chamber; and means for passing a gas having a temperature less than that of said fluid through said chamber in direct heat exchanging relationship with said fluid.

2. In a heat exchanger system the combination comprising: an upright and unobstructed heat exchange chamber for receiving a high temperature electrically conductive fluid and having fluid inlet means at its upper end and fluid outlet means at its lower end, the minimum internal transverse dimension of said chamber being at least several times greater than the total internal transverse dimension of said inlet means; means for introducing said electrically conductive fluid into said chamber through said inlet means; means located at the junction of said inlet means and said chamber for providing in said inlet means a magnetic field having a steep field gradient, said field gradient being highest at the junction of said inlet means and said chamber, said magnetic field extending into said chamber and having a direction in said fluid inlet means substantially the same as the direction of flow in said inlet means and extending radially outwards in said chamber to cause said fluid to be substantially broken up into droplets and directed radially outwardly as it enters said chamber; means for providing at least one additional magnetic field intermediate said inlet and outlet means for retarding the fall of and further dispersing said droplets in said chamber; and means for passing a gas having a temperature less than that of said fluid through said chamber in direct heat exchanging relationship with said fluid.

References Cited in the file of this patent

UNITED STATES PATENTS

| 3,008,044 | Buchold | Nov. 7, 1961 |

FOREIGN PATENTS

| 728,145 | Great Britain | Apr. 13, 1955 |
| 141,549 | Sweden | Aug. 4, 1953 |